CONTROL APPARATUS

Filed Oct. 6, 1966

INVENTORS.
TAFFEE T. TANIMOTO
PETER MENGERT
BY
ATTORNEY

United States Patent Office 3,525,856
Patented Aug. 25, 1970

3,525,856
CONTROL APPARATUS

Peter Mengert, Somerville, and Taffee T. Tanimoto, Newton, Mass., assignors to Honeywell Inc., Minneapolis, Minn., a corporation of Delaware
Filed Oct. 6, 1966, Ser. No. 584,783
Int. Cl. G02b *27/00;* G06g *9/00*
U.S. Cl. 235—150 7 Claims

ABSTRACT OF THE DISCLOSURE

An optical computer in which a matrix of elements represented by a group of transparencies of different transmissivity transmits light from three sources representative of the elements of a vector. The amount of light which emerges is representative of the resultant vector and this value is fed back to the three sources to complete the mathematical balance of the system.

Figure 1:
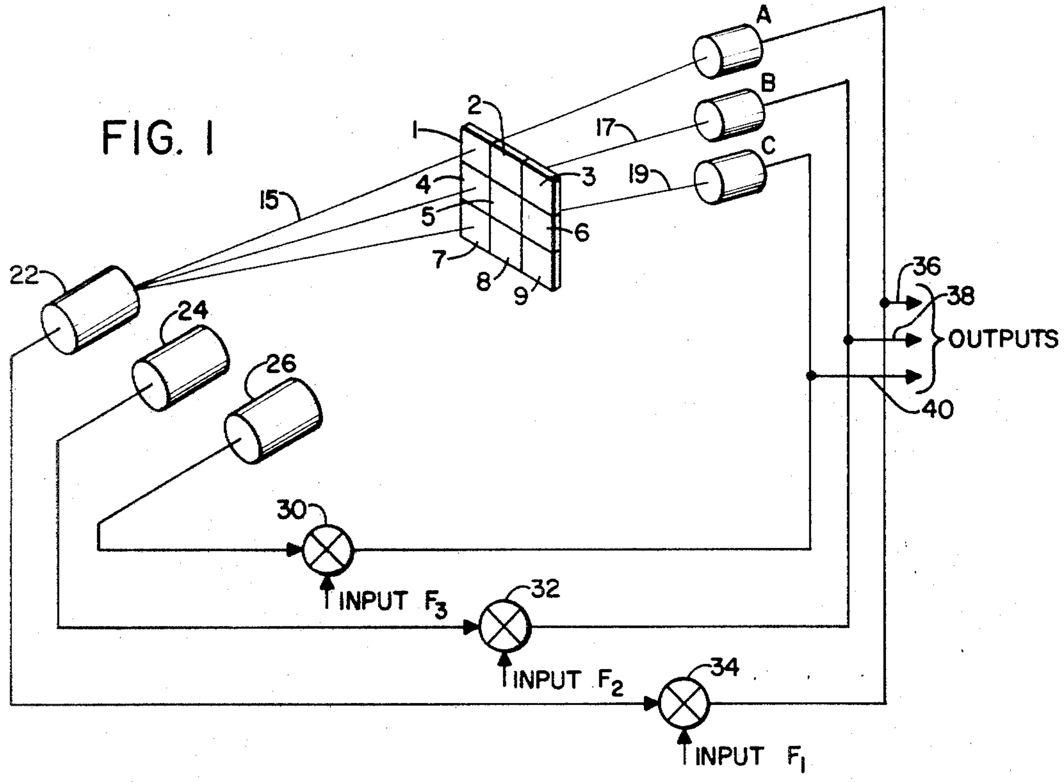

The present invention relates to analogue computers which utilize electro-optical techniques to accomplish arithmetic operations. More particularly, an analogue computer for generating the product of a matrix and a vector is disclosed.

In the past, matrix calculations have required considerable amounts of time because of the numerous calculations necessary to multiply large matrices. Even high speed digital computers are inadequate for the task due to their inherently sequential type of operation. A solution to this problem is to utilize parallel computation, a technique particularly suited to optical schemes such as taught by the present invention.

Before describing out invention it is necessary to consider what calculation is to be performed by the present invention. The mathematical operation is expressed by the equation $$\overline{F}=[M]\overline{X} \qquad (1)$$

where $\overline{F}$ is a known vector and [M] is a square matrix of known quantities. The vector $\overline{X}$ is to be determined. In terms of $\overline{X}$ the equation becomes $$\overline{X}=[M]^{-1}\overline{F} \qquad (2)$$

where $[M]^{-1}$ is the inverse of [M]. In accordance with the implementation of the present invention these equations may be better expressed with the following substitutions:

$$[M]=[I]-[R] \qquad (3)$$

$$\overline{X}=\overline{U}+\overline{F} \qquad (4)$$

[I] is the identity matrix. Equation 1 then becomes $$\overline{F}=([I]-[R])(\overline{U}+\overline{F}) \qquad (5)$$

which simplifies to $$[R](\overline{U}+\overline{F})=\overline{U} \qquad (6)$$

An equation having this form may be solved iteratively by assuming a first trial value of 0 for $\overline{U}$, determining the corresponding value of $[R](\overline{U}+\overline{F})$ to define a second trial value of $\overline{U}$, determining the corresponding value of $[R](\overline{U}+\overline{F})$ to define a third trial value of $\overline{U}$, and continuing until the difference between successive computed values of $\overline{U}$ is insignificantly small. The value of $\overline{U}+\overline{F}$ is then sufficiently close to $\overline{X}$.

The present invention contemplates unique and novel apparatus for accomplishing the above-described operations. A number of radiation filters, which may be, for example, film transparencies, are arranged in a planar square array so that each transparency has a transmissivity proportional to the value of the element in the corresponding position in the square matrix [R] determined according to Equation 3. A plurality of sources of light, one for each component of the vector, are positioned behind the planar matrix array. They vary in intensity with the applied voltage and represent the plurality of components making up the vector $\overline{F}$. When the light from one of the sources passes through one of the transparencies the emergent light has an intensity which is proportional to the product of the intensity of the source and the transmissivity of the matrix element. Thus, a multiplication operation has been optically performed with one of the quantities to be multiplied represented by the applied source voltage and the other quantity represented by the transmissivity of the matrix element.

Associated with these light sources and the array of transparencies is a plurality of detectors which give electrical outputs in proportion to the intensity of light falling upon them. They are located on the opposite side of the array from the sources, and these outputs represent a plurality of elements making up vector X.

The planar array is so scaled and the sources and detectors are so positioned that one light beam from each source passes through a corresponding element in one column of the matrix and impinges on a single detector. This detector accordingly receives an intensity of light proportional to the sum of each of the respective products since light impinging at a single location from separate sources is additive. A plurality of detectors is used, one for each column in the matrix, so that each detector has a signal proportional to the sum of the products associated with that column. Thus, each detector output represents an element in the vector $\overline{U}$. The signals from the detectors, that is, the vector $\overline{U}$, may be applied to the light sources so that their input becomes equal to the vector $(\overline{F}+\overline{U})$. This process is then repeated in an iterative manner until an equilibrium is established and the closed loop stabilizes. When this repetitive process no longer changes the input. $\overline{F}+\overline{U}$, the value of the inputs may be read out giving the vector $\overline{X}$.

Consequently, it may be seen that the present invention provides an electro-optical computer whose object is speed coupled with relative simplicity of design and associatively low cost.

Figure 2:
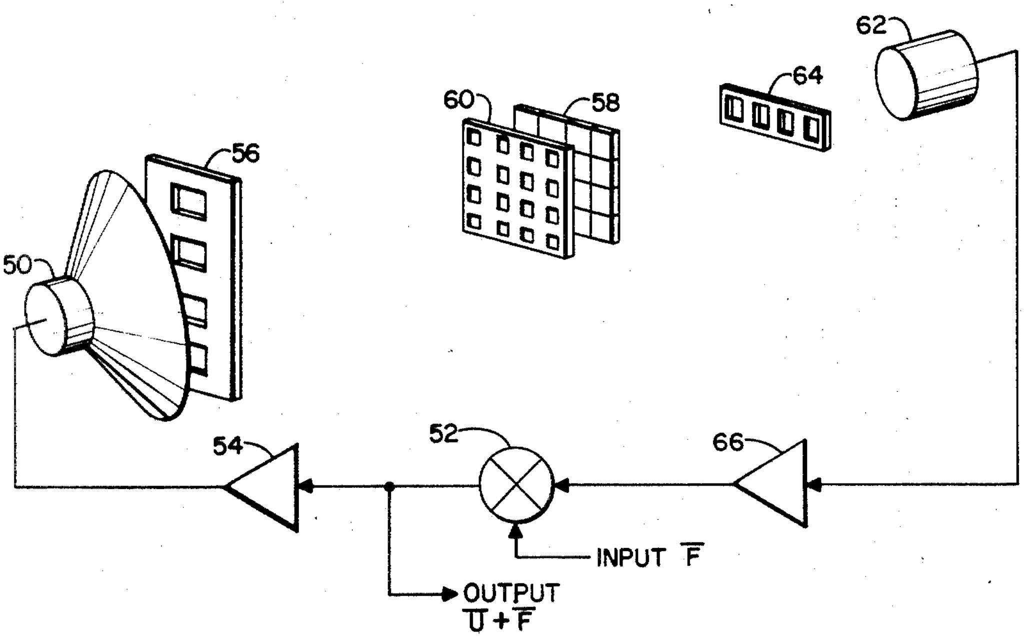

For a more complete understanding of the invention, its objects and advantages, reference should be had to the accompanying detailed description and drawings in which:

FIG. 1 is a schematic drawing of one simplified embodiment of our invention demonstrating the basic principles of operation; and FIG. 2 is an expanded schematic view of another possible embodiment of the present invention.

Referring to FIG. 1 a number of filters or transparencies are shown numbered 1 through 9 which are arranged in a 3 by 3 array representative of the matrix [R]. These transparencies may be films of varying shades of opaqueness, or clear films with varying densities of opaque areas mixed in, or any other mechanism whereby each of the nine elements has a net transmissivity which is proportional to the value of the corresponding element in the 3 by 3 mathematical matrix [R]. Since many devices may be used to achieve this proportionizing of intensities, and also, since the present invention is not limited to visible light these transparencies may be properly termed proportional energy transmitting matrix elements or more simply matrix elements.

Disposed behind the array are three sources of light shown at A, B and C, each of which operates to radiate light or energy with an intensity substantially proportional to its energization. Sources A, B and C are located so as to project beams of light through all of the matrix elements whereupon they are received by a group of three detectors 22, 24 and 26. Sources A, B and C are positioned so that the light beams, shown as beams 15, 17 and 19 in FIG. 1, pass through elements 1, 4 and 7 of the array and intersect at detector 22.

The intensity of light from source A is initially representative of one component of $\overline{F}$ namely $F_1$, the input signal to source A. The transmissivity of element 1 is representative of the value of the number in a corresponding position of matrix [R]. As a consequence, the intensity of beam 15 after passing through element 1 is proportional to $F_1$ times the upper left matrix element. Likewise, the intensity of beam 17 represents $F_2$ times matrix element 4 and beam 19 represents $F_3$ times matrix element 7. Since non-coherent light impinging at one spot from separate sources is additive, the intensity of light received by detector 22, and correspondingly its output signal, is proportional to the sum of the products of the vector components and the three respective elements in the first column of the matrix. In accordance with the well-known rule for multiplying a matrix and a vector, this output signal is the first component of their product which is to be the first component U, of the first trial value of vector $\overline{U}$. Similarly, beams from sources A, B and C respectively pass through elements 2, 5 and 8 and intersect on detector 24 so as to generate the second component $U_2$ of the first trial value of $\overline{U}$. Also, beams from A, B and C pass through elements 3, 6 and 9 respectively and intersect on detector 26 to form the third component $U_3$ of trial vector $\overline{U}$. Detectors 22, 24 and 26 are positioned to receive only those beams of light mentioned above. Any extraneous beams, such as the one from source A through element 5, do not strike the detectors.

In order to perform the operation expressed in Equation 6 it is necessary to add the first trial value of $\overline{U}$ to $\overline{F}$. In FIG. 1 this is done by feeding the component signals of trial U to a group of three summing circuits 30, 32, and 34 which add trial $\overline{U}$ to $\overline{F}$ so that sources A, B and C now have intensities proportional to the components of a trial vector $(\overline{U}+\overline{F})$. Recomputation results and the apparatus quickly reaches a stable state having a fixed $(\overline{U}+\overline{F})$. When this value is reached, the voltages to sources A, B and C will be proportional to the true components of $(\overline{U}+\overline{F})$ or $\overline{X}$ which components may then be monitored on a group of three output leads 36, 38 and 40.

It should be noted that the basic principles herein described may be extended to any size matrix and vector. Also, in order to permit elements of the matrix [R] and the vector $\overline{F}$ to have negative values, the transparencies and voltages utilized may be biased to move the zero point to a fixed transmissivity and voltage as required.

In FIG. 2 another embodiment of our invention is disclosed. The input vector $\overline{F}$ is displayed on the face of a cathode ray tube 50 as a vertical linear pattern of intensities proportional to the components of $\overline{F}$. The input signal $\overline{F}$ is routed through a summing circuit 52 and a correcting amplifier 54 which compensates for any nonlinearities in tube 50. A mask 56 serves to better define the boundaries of the display on tube 50. The four beams from tube 50 and mask 56 then pass through the elements in a 4 by 4 matrix 58 whose transparent areas are defined by a mask 60. The resulting four components of the output vector $\overline{U}$ are read out horizontally by a vidicon tube 62. Here again, a mask 64 is used to insure that only the light from the proper paths impinges on vidicon 62. At this point it should be noted that the positioning of the various optical elements in FIG. 2 is for clarity only and that the true spacing and positioning of the parts may be varied greatly as the particular configuration requires, Signal $\overline{U}$ on the vidicon passes through a correcting amplifier 66 so that nonlinearities in the vidicon 62 may be compensated. The signal is then applied to the summing circuit 52 whereby it is added to the input F. The resulting vector $(\overline{U}+\overline{F})$ is then used to drive tube 50 so that a new mathematical operation may be performed. The process continues until $(\overline{U}+\overline{F})$ times the matrix [R] no longer gives a different output. At this time the signal $(\overline{U}+\overline{F})$ may be monitored between the summing circuit 52 and compensating amplifier 54. Any suitable readout means may be employed such as an oscilloscope.

In general the persistence of the phospher on tube 50 must be long enough to allow the signal to travel around the loop in order to achieve stability. The matrix array may be satisfactorily constructed from photographic film although other light attenuating mechanisms are equally within the spirit and scope of the invention. In fact, many constructional variations are possible and thus we do not intend to limit the invention to the embodiments shown.

We claim:

1. Computing apparatus comprising, in combination:
- means providing a plurality of variable sources of radiant energy equal in number to the number of components in a known vector;
- means providing a plurality of energy detectors giving outputs which vary with the intensity of their irradiation;
- means providing a plurality of groups of energy transmitting elements having transmissivities corresponding to the magnitudes of the elements in columns of a predetermined matrix;
- means mounting said sources of energy, said transmitting elements, and said detectors so that each detector is irradiated from all said sources through elements of one only of said groups;
- means providing a plurality of input signals corresponding in magnitude to the magnitudes of the components of said known vector;
- combining means each receiving one of said input signals and the output from one of said detectors, to provide a plurality of control signals;
- means varying said sources of energy in response to said control signals to complete a closed dynamic system tending toward a condition of equilibrium; and
- output means energized with said control signals.

2. Apparatus according to claim 1 in which the number of energy detectors, transmitting element groups, input signals, and combining means is the same as the number of energy sources, and as the number of rows and columns in the matrix.

3. Apparatus according to claim 1, in which said energy sources and said energy detectors are arranged in mutually orthogonal straight lines, and said transmitting elements are arranged in a rectangular matrix of rows and columns which are parallel severally to said straight lines.

4. Apparatus according to claim 1, in which the first named means combines a cathode ray tube and means connected to said tube for producing therein a plurality of independent spots of light of variable intensity.

5. Apparatus according to claim 1, in which the second named means includes a vidicon tube, mounted so that independent spaced areas thereof comprise said energy detectors, and means connected to said tube for deriving therefrom signals representative of the irradiation of said areas.

6. Apparatus for determining the vector by which a predetermined matrix must be multiplied to give a product equal to a second vector comprising, in combination:
- means providing a plurality of variable sources of radiant energy equal in number to the number of components in the second vector;
- means providing a plurality of energy detectors giving outputs which vary with the intensity of their irradiation;

means providing a plurality of groups of energy transmitting elements corresponding in number and transmissivity to the number and magnitudes of the elements in columns of a working matrix which is the difference between the identity matrix and the predetermined matrix;

means mounting said sources of energy, said transmitting elements, and said energy detectors so that each detector is irradiated from all said sources through elements of one only of said groups;

combining means each receiving one of said input signals and the output from one of said detectors, to provide a plurality of control signals;

means varying said sources of energy in response to said control signals, to complete a closed dynamic system tending toward a condition of equilibrium; and output means energized with said control signals, so that when the apparatus reaches the condition of equilibrium the output of said output means is representative of the vector being determined.

7. Computing apparatus comprising, in combination:

a plurality of aligned variable sources of radiant energy equal in number to the number of components in a known vector;

a like plurality of energy detectors giving outputs which vary with the intensity of their irradiation, and aligned orthogonally with respect to said sources;

a like plurality of groups of energy transmitting elements corresponding in arrangement, number, and transmissivity to the arrangement, number, and magnitudes of the elements in columns of a predetermined rectangular matrix;

means mounting said sources of energy, said transmitting elements, and said detectors so that the columns of said matrix are parallel to said sources and the rows of said matrix are parallel to said detectors, and so that each detector is irradiated from all said sources through separate elements of one only of said groups;

a like plurality of input signal sources giving input signals corresponding in magnitude to the magnitudes of the components of said known vector;

combining means each receiving one of said input signals and the output from one of said detectors, to provide a plurality of control signals;

means varying said sources of energy in response to said control signals to complete a closed dynamic system tending toward a condition of equilibrium; and output means energized with said control signals.

References Cited

UNITED STATES PATENTS

| | | | |
|---|---|---|---|
| 2,795,705 | 5/1957 | Rabinow | 250—219 |
| 3,099,820 | 7/1963 | Ketchledge | 340—173 |
| 3,191,157 | 6/1965 | Parker et al. | 340—173 |
| 3,205,363 | 9/1965 | Heetman | 250—219 X |
| 3,214,595 | 10/1965 | Johnson et al. | 250—219 |
| 3,274,380 | 9/1966 | Moskowitz | 235—181 X |
| 3,305,669 | 2/1967 | Fan | 250—219 X |

FOREIGN PATENTS

| | | |
|---|---|---|
| 1,190,324 | 4/1965 | Germany. |

MALCOLM A. MORRISON, Primary Examiner

R. W. WEIG, Assistant Examiner

U.S. Cl. X.R.

230—219; 235—181; 250—204, 205, 209, 220